Oct. 20, 1959      C. E. BARRINGTON      2,909,194
RELAY VALVE
Filed Feb. 15, 1954      2 Sheets-Sheet 1
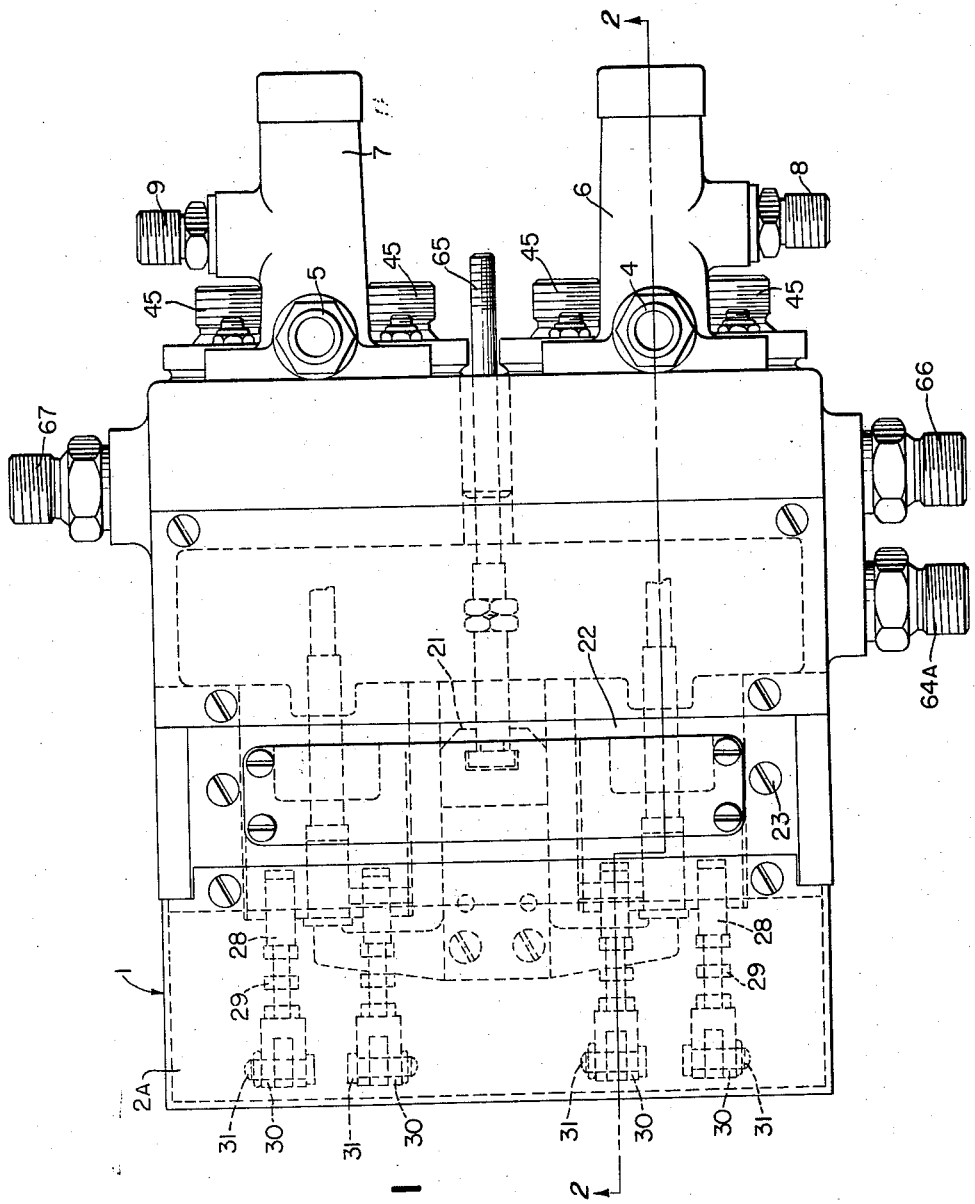
FIG. I
INVENTOR.
CHARLES ERNEST BARRINGTON
BY
R. L. Miller
ATTORNEY Oct. 20, 1959     C. E. BARRINGTON     2,909,194
RELAY VALVE
Filed Feb. 15, 1954     2 Sheets-Sheet 2
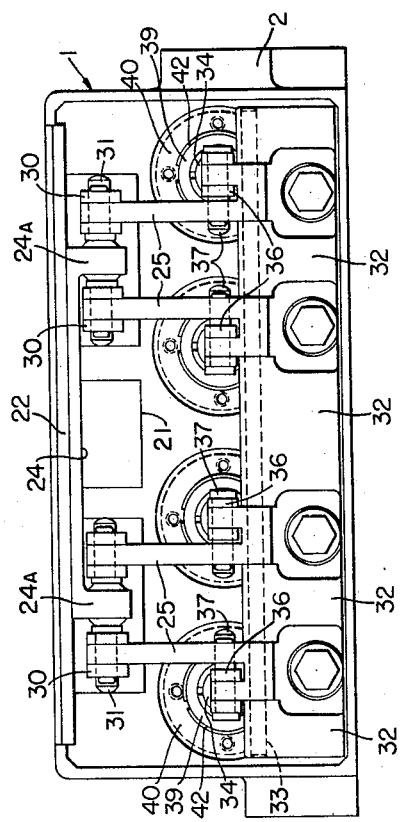
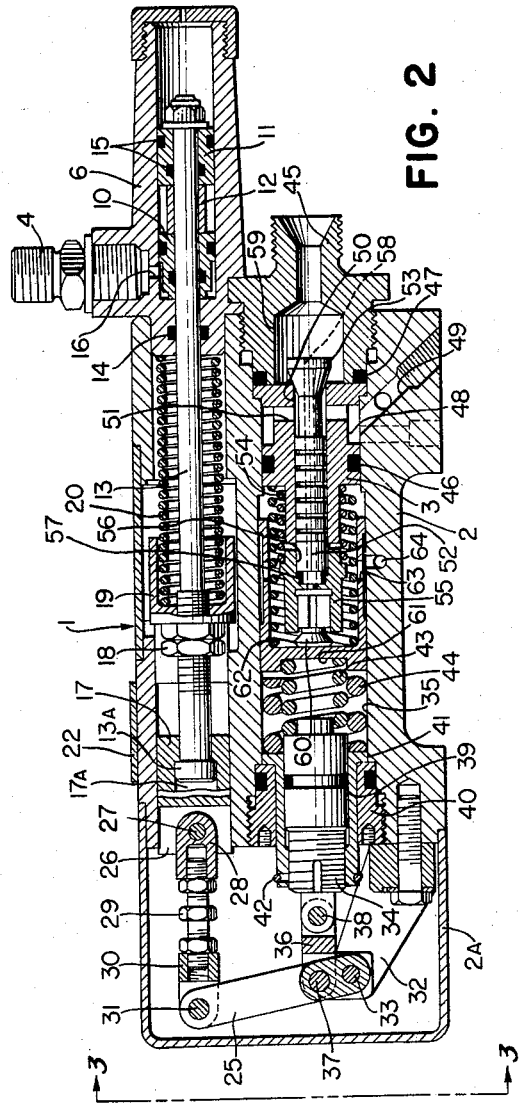
*INVENTOR.*
CHARLES ERNEST BARRINGTON
BY
*R. L. Miller*
ATTORNEY

United States Patent Office 2,909,194
Patented Oct. 20, 1959

2,909,194

RELAY VALVE

Charles Ernest Barrington, West Kirby, England, assignor, by mesne assignments, to The Goodyear Tire & Rubber Company, a corporation of Ohio Application February 15, 1954, Serial No. 410,346

1 Claim. (Cl. 137—622)

This invention relates to valves, and especially to a relay valve for use in brake assemblies wherein both mechanical and hydraulic means can be used for controlling the hydraulic output pressure of the relay valve.

The relay valve of the invention is especially adapted for use with airplanes and it has been developed to provide maximum safety in brake operation to avoid any possible failure in the braking system under anything near average operating conditions. The relay valve is designed to be controlled by a foot operated pedal, or by a second control such as a hand lever, and to control the flow of pressure from a pressure fluid source to a brake system with the hydraulic brake pressure being proportionate to the mechanical force applied to the brake pedal or other control.

The general object of the present invention is to provide a novel type of valve characterized by the provision of a sliding valve plunger for controlling valve action and wherein hydraulic pressure is balanced against spring pressure and with the braking pressures being proportional to the load applied to the springs in the valve.

Another object of the invention is to provide a valve having a plurality of outlets and valve means therein for relaying pressures from either hand, or foot controlled pedals in duplicated supply systems to the wheel brake or brakes.

Another object of the invention is to provide a valve which can be operated by either mechanical or hydraulic controls, and which can be operated by either or both of a pair of foot pedals that connect to hydraulic pressure sources, such as a pair of master cylinders, provided in the brake control apparatus.

Yet another object of the invention is to provide a relay valve especially adapted for use in a braking system and wherein either or both of two duplicate controls can actuate the relay valve for application of braking pressures through both of two brake pressure applying means in direct combination with the brake controlled by the relay valve of the invention.

Yet a further object of the invention is to provide a relatively compact, sturdy type of a control valve especially adapted for relaying braking pressures to brakes or brake systems.

The foregoing and other objects and advantages of the invention will be made more apparent as the specification proceeds.

For a better understanding of the invention, reference should be had to the accompanying drawings wherein a relay valve embodying the principles of the invention is shown, and wherein:

Fig. 1 is a plan of the relay valve of the invention;

Fig. 2 is a vertical section taken on line 2—2 of Fig. 1; and

Fig. 3 is an end elevation of the valve of Fig. 2 taken on line 3—3 thereof with the end cover removed.

The relay valve of the invention in general includes a valve housing, a valve plunger slidably positioned in the valve housing for control of flow of liquids therefrom, the valve housing having liquid under pressure supplied thereto, poppet valve means operatively connected to the valve plunger to aid in controlling the operation thereof and flow circuits set up thereby, hydraulically operated piston means connected to a brake actuation supply circuit, spring means for urging the poppet valve means to a closed position to control the flow circuit in the valve, mechanical means connecting the piston means to the spring means for varying the pressure exerted thereby with changes in the pressure exerted on the piston means, and a control member connected to the mechanical means for independent actuation thereof when desired.

*General construction of valve*

The relay valve of the invention is indicated as a whole by the numeral 1 and it includes a valve housing 2 in which a plurality, in this instance four, valve bodies 3 are suitably secured in parallel, spaced relation. The relay valve 1 is adapted to be secured to a pair of operating master cylinders, or similar means for actuation by either or both of said master cylinders (not shown) by transmittal of hydraulic pressure fluid therefrom to the valve housing 2. Figs. 1 and 2 best show that pressure inlet fittings or lines 4 and 5 from separate pressure sources are connected to hydraulic cylinders 6 and 7, respectively, that are secured to spaced portions of the valve housing 2, as shown in the drawings. A second pair of pressure inlet lines 8 and 9 connect to the cylinders 6 and 7, respectively, and receive pressure from a second pressure supply source, such as a master cylinder for a brake system. Each of the cylinders 6 and 7 receives a pair of tandem connected pistons 10 and 11 therein and such pistons are suitably separated, as by a spacer sleeve 12. The pistons 10 and 11 in each cylinder are secured to a pull rod 13 which extends from each of the cylinders 6 and 7 and is sealed with relation thereto as by a gasket 14. Piston 10 is slidable with relation to the pull rod 13 to permit operation of the pull rod by only the piston 11. The pistons 10 and 11 are sealed with relation to the pull rod 13 and with relation to the cylinders in which they are received by gaskets 15 and pressure is transmitted from the pressure inlet line 4, for example, through a bore or inlet port 16 in the cylinder 6. Thus the pressure transmitted to the valve housing 2 through the inlet line 4 is applied to the piston 10 for urging it axially outwardly of the cylinder 6, whereas a similar inlet port connects the pressure inlet line 8 to the piston 11 for likewise urging it outwardly of the cylinder. Thus either pressure source, which may be a master cylinder connected to a brake foot pedal, may actuate the pistons 10 and 11 to move the pull rods 13 and change the action of the relay valve 1, as hereinafter described.

*Mechanical pressure transmitting means*

In the relay valve 1 of the invention, a pair of the pull rods 13 are provided with each pull rod being positioned in operative engagement with piston means on one end of each pull rod 13. Each of the pull rods 13 is engaged with a slide block 17 which is slidably carried by the valve housing 2, usually in the upper portion thereof. Each pull rod 13 has a head 13A thereon that engages a shoulder in a recess 17A extending in from an end of the slide block 17. Each of the pull rods 13 usually carries lock nut means 18 thereon in adjustable engagement therewith. An adjustable stop, in this instance a stop sleeve 19, is resiliently forced against the lock nuts 18 by a compression coil spring 20 compressed between the inner end of each of the cylinders 6 and 7 and a closed end of the stop sleeve 19 for returning the pull rods 13 to the no load or inoperative position, as shown in the drawings. A control slide block 21 is also slidably received in an upper portion of the valve housing 2 with all of the slide blocks 17 and the control slide block 21 being retained in engagement with the valve housing 2 by means of a bearing plate 22 secured over an upper portion of the valve housing 2 by suitable screw means 23. The control slide block 21 has a narrow connecting plate 24 suitably secured thereto at an exposed end of such slide block so that the connecting plate is positioned at an end of the valve housing 2. The connecting plate has end buttons or brackets 24A that normally are urged against exposed end portions of the slide blocks 17 by external means (not shown) through the agency of the pull rod 65 for unitary control of the different valves in the relay valve 1 by the control slide block 21, as hereinafter explained.

Braking pressures applied to the pull rods 13 from the pressure inlet lines 4 and 5 through the piston means 10 and 11 will thus effect sliding action of the slide blocks 17, and this motion is used to control the position of levers 25 that are individually associated with the plurality of outlet control valves provided in the relay valve 1. Preferably each of the slide blocks 17 has a pair of spaced bifurcated sections, or similar portions 26 on the end thereof normally exposed at the edge of the valve housing 2. Each of the sections 26 has connector pins 27 suitably journalled therein and engaging an end fitting 28 positioned in the recess of the section 26. The end fitting 28 engages with the individual levers 25 through adjustable control screws 29. These control screws 29 have forked end fittings 30 on the other end thereof for engaging pins 31 used to secure such end fittings 30 to the levers 25. A cover 2A is secured to the housing 2 to enclose the levers 25 and the adjacent end of the valve housing.

The levers 25 are fulcrumed on the valve housing 2 by means of brackets 32 secured thereto and with fulcrum pins 33 pivotally securing such levers to the brackets 32. Movement of the levers 25 is used to move plungers 34 individually and reciprocably associated with a plurality of valve bores 35 provided in spaced portions of the valve housing 2. Each plunger 34 connects to its control lever 25 by a control link 36 pivotally engaging the lever 25 by a pin 37 and secured to an apertured end bracket on the plunger 34 by a connector pin 38. Each of the plungers 34 is positioned by and in a sleeve 39 with an extremely close tolerance fit, such as a lapped fit between the sleeve 39 and a plunger housing 40 in which the sleeve 39 is slidably positioned. Usually the sleeve 39 has a flange 41 on its inner end for engaging the plunger housing 40 to retain the sleeve 39 in fixed position for slidably receiving the plunger 34 therein. Seal or gasket means may be provided intermediate the sleeve 39 and plunger housing 40, if desired. Usually the plunger 34 is in threaded engagement with the plunger sleeve 39 and a suitable snap type of a lock ring 42 is engaged with the sleeve 39 and has lugs or fingers (not shown) thereon that seat in axially extending recesses provided in the plunger 34 to retain such plunger and sleeve fixed against relation rotation. The plunger 34 is positioned, in all events, for engagement with the pin 38 and the link 36, as shown. One end of a pair of coiled inner and outer springs 43 and 44 is shown based against an end of the plunger 34 and sleeve 39, respectively, for purposes to be described in detail hereinafter.

*Individual valve means in valve housing*

The valve housing 2 of the invention positions the plurality of the valve bodies 3 therein and has a plurality of separate outlet valves at spaced transverse portions of the valve housing. End fittings 45 are suitably secured in the valve housing and are individually operatively connected to each of such valve bodies 3 which are suitably secured in the valve housing 2, to complete the enclosure for the separate valve means in the relay valve 1. Gaskets 46 are carried by the valve bodies 3 to separate the inlet and outlet flow paths in the valve construction from each other, while conventional gaskets 47 are carried by each of the end fittings 45 to seal them to the valve housing 2. Fig. 2 of the drawings best shows that each of the valve bodies 3 has an annular recess or chamber 48 therein on the valve body periphery and with such recess connecting to one or more inlet bores 49 in the valve housing 2. Each inlet bore 49 is adapted to be connected to a suitable source of brake actuation fluid under pressure by any conventional means (not shown). Any source of fluid pressure can be used as long as such fluid pressure will supply pressure in excess of that desired for operation of the brake means controlled by the relay valve 1 of the invention. Variations in the supply pressure hence will not affect brake operation. The valve bodies 3 have bores 50 therein and ports 51 to connect the recess 48 to the bore 50 for flow of supply fluid under pressure to the bore 50.

The actual valving action in the valve bodies 3 is controlled and the individual valves are completed by valve plungers 52 one of which is slidably engaged with each of the bores 50 in each valve body 3. Each valve plunger 52 has a conically shaped head 53 provided thereon which head is normally seated against an end of the valve body to shut off flow of fluid therethrough and to control the fluid pressure flow path in the different valve bodies 3. The valve plungers 52 are urged to their closed positions by means of compression springs 54 that seat on the valve body 3 and urge a poppet valve seat 55 axially away from the valve body 3. Each of the valve plungers 52 is removably secured, as by means of set screws (not shown) to its associated valve seat 55. The poppet valve seats 55 each have a bore 56 therein and a gasket 57 is carried on the periphery of each valve plunger 52 to seal its connection to the bore 56 of the poppet valve seat. Each of the valve plungers 52 has an axially extending bore 58 extending therethrough to connect a discharge chamber 59 formed in the end fitting 45 to the bore 56 of the poppet valve seat 55 to control action of a poppet valve 60 slidably carried by such poppet valve seat 55.

The control means of the invention are completed by means of a plurality of pusher sleeves 61 slidably positioned in the individual valve bores 35 provided in the valve housing 2. Each pusher sleeve 61 is urged away from the poppet valve 60 by a coil spring 62 engaging the pusher sleeve 61 and based against a portion of the valve body 3. However, as shown in the drawings, one end of the inner spring 43 is also based against the pusher sleeve 61 on the opposite surface thereof to that engaged by the spring 62 so that the outer spring 44 can be brought into engagement with the pusher sleeve 61 under high or emergency pressures, and whereby the forces exerted by such springs 43, 44 and 62 are opposite to each other. Usually the control springs 43 and 44 are made of much greater diameter wire than the spring 62 and are adapted to overcome the resistance set up by the spring 62 to control the position of the pusher sleeve 61 in the valve assembly. When the poppet valve 60 is off of its valve seat, as shown, liquid may pass through the bore 58 in the valve plunger 52 and flow down around the pusher sleeve 61 and through holes 63 provided therein to a fluid return bore or port 64 provided in the valve housing 2 and connected to fitting 64A, which fluid return port is adapted to connect to the pressure supply means system connected to the pressure inlet bore 49 for return of pressure liquid thereto.

*Operation*

In operation, it will be seen that supply of inlet pressure to or through either of the inlet pressure lines 4 or 5, or both, will set up such forces on the pull rods 13 as to move them axially of the valve 1 in the direction indicated in the drawings. Such movement of the pull rods likewise moves the slide blocks 17 which in turn effect a sliding action on the plungers 34. This movement of the plungers moving them axially inwardly of the relay valve 1 will in turn, through the coil spring 43 alone or in combination with the outer spring 44, move the pusher sleeve 61 inwardly to seat the poppet valve 60 on the poppet valve seat 55. Further movement of the pusher sleeve 61 will then move the poppet valve seat 55 axially in the valve to free the conical head 53 of the valve plunger 52 from engagement with the valve body 3. Thus inlet pressure will flow through the chamber 59 and out through the fittting 45 for application of brake pressure to the braking means normally connected thereto.

On release of pressure as applied to the inlet lines 4 and 5, as by release of the foot control pedal connected thereto, to pull rod 13 will be moved back to its original position by the return spring 20 and the associated means will move the plungers 34 outwardly of the valve to release pressure on the control springs 43 and 44, which action will release the pusher sleeve 61 from pressure engagement with the poppet valve 60. The pressure applied to the axially inner end of the poppet valve 60 will force it from engagement with its associated valve seat so that liquid can drain from the brake system into the outlet or return line connected to bore 64 and thus reduce or terminate braking action.

It likewise should be noted that an automatic control action is provided so that if at any time the brake liquid pressures in the chambers 59 and exerted on the poppet valve 60 through the bore 58 are greater than the control forces exerted on the poppet valve 60 through the spring or springs 43 and 44 and pusher sleeve 61, such poppet valve will automatically move from its seat to exhaust brake application liquid from such brake actuation circuit and reduce brake actuation pressure. Thus a balanced relationship is provided between the liquid pressure means acting on one side of the pusher sleeve 61 and the mechanical pressure action exerted on the other side of such pusher sleeve by the springs 43 and 44 and associated means connected thereto.

*Hand brake operation*

A center pull rod 65 is slidably positioned in the valve housing 2 and it engages with the control slide block 21. The center pull rod 65 then is connected by suitable means (not shown) to a hand actuated lever, or other brake control means so that all of the operating valves of the relay valve 1 of the invention can be controlled and operated as a unit through this center pull rod 65.

An inlet fitting 66 connects to the inlet bore 49 and a second inlet fitting 67 may be provided so that two pressure supply systems may connect to the relay valve 1. The different supplies would connect to alternate valve means and preferably alternate outlet fittings 45 of the individual valves are connected to different brake means to be controlled by the relay valve 1 of the invention. However, usually adjacent valve outlet fittings are connected to different brake means associated with the same wheel, and possibly even to the same brake means, so that in case of failure of one of such brake means, or of one conduit, the second brake conduit or means will still operate to provide the desired brake action.

The assembly of the plunger and sleeve 39 is adjustable to vary the position at which the compression spring 44 acts upon the pusher sleeve 61, thus enabling the spring force to be increased by a greater amount for the same travel at any required set pressure. This feature is incorporated to give variable settings in pilot's control feel in changing from normal pressure range controlled by spring 43 to additional pressure range controlled by both springs 43 and 44 owing to the resultant increase in spring rate when spring 44 comes into action.

It will be seen that the engagement of the head 13A of the pull rod 13 will move the slide block 17 only in one direction and that the slide block can be forced in such direction independently of the pull rod whose head 13a will merely move into recess 17A at such time. The control slide block 21 and connecting plate 24 will push the slide blocks 17 independently and will cause movement of the levers 25 for relay valve control, by the pressure contact of brackets 24A on the end portions of the slide blocks 17.

From the foregoing, it will be seen that a novel type of a relay valve has been provided by the invention and wherein either of two foot control pedals, for example, can be used for controlling the actuation of a plurality of separate valve means in a relay valve of the invention. Furthermore, a unitary control also is provided separate from the foot pedals for actuation of the relay valve means. It should be noted that the poppet valve is adapted to float between balanced pressures supplied by the foot controlled pedals and applied to the poppet valves and the hydraulic pressures set up in the actual braking circuit. Hence slight reductions in the foot pedal pressure will release some brake circuit pressure and a new balanced braking action will be secured. The valve is of sturdy construction and will have a relatively long operating life with a minimum of maintenance so that the objects of the invention are achieved.

While a certain representative embodiment and details have been shown for the purpose of illustrating the invention, it will be apparent to those skilled in this art that various changes and modifications may be made therein without departing from the spirit or scope of the invention.

What I claim:

In a relay valve, a valve body, said body having a plurality of pull rod cylinders having parallel axes, a pull rod mounted for sliding movement axially of each cylinder, a pair of pistons mounted for individual sliding movement on each pull rod and engaging its cylinder, a plurality of fluid pressure inlets to each cylinder whereby each pull rod may be operated selectively from a plurality of fluid pressure sources, a plurality of valve cylinders in each body, each valve cylinder being parallel to a pull rod cylinder, each valve cylinder having a port connecting it to a brake operating cylinder and having fluid pressure supply and exhaust ports, a tubular valve body removably mounted in each valve cylinder and having a valve seat, a valve plunger slidably mounted in the bore of said body and engageable with its valve seat, a removable valve seat secured to the stem of said plunger and sealed thereto, said plunger having an axial passage therethrough connecting with and sealed to said removable valve seat, a poppet valve engageable with said removable valve seat for closing it, a sleeve fitted in each valve cylinder for axial movement and engageable with said poppet valve for closing the axial passage of said valve plunger, an operating plunger slidably mounted in each valve cylinder, resilient spring means mounted between said operating plunger and said sleeve for yieldably transmitting motion from said plunger to said sleeve, and substantially inflexible linkage for positively transmitting motion from one of said pull rods to one of said plungers.

References Cited in the file of this patent

UNITED STATES PATENTS

| | | |
|---|---|---|
| 1,069,280 | Blair | May 8, 1928 |
| 1,927,700 | Dickinson | Sept. 19, 1933 |
| 2,024,343 | Eaton | Dec. 17, 1935 |
| 2,092,364 | Stevens | Sept. 7, 1937 |
| 2,239,148 | Ernst | Apr. 22, 1941 |
| 2,275,255 | Freeman | Mar. 3, 1942 |
| 2,324,690 | Gardiner | July 20, 1943 |
| 2,495,338 | Loweke | Jan. 24, 1950 |
| 2,577,462 | Hackney | Dec. 4, 1951 |
| 2,682,282 | Trevaskis | June 29, 1954 |
| 2,722,233 | Schneck | Nov. 1, 1955 |